United States Patent
Conroy et al.

(10) Patent No.: US 9,231,630 B2
(45) Date of Patent: Jan. 5, 2016

(54) RADIO DEVICE HAVING DYNAMIC INTERMEDIATE FREQUENCY SCALING

(75) Inventors: Cormac S. Conroy, Campbell, CA (US); Timothy P. Pals, San Diego, CA (US)

(73) Assignee: San Diego, CA, San Diego, CA (US)

( * ) Notice: Subject to any disclaimer, the term of this patent is extended or adjusted under 35 U.S.C. 154(b) by 220 days.

(21) Appl. No.: 12/435,980

(22) Filed: May 5, 2009

(65) Prior Publication Data

US 2010/0285769 A1  Nov. 11, 2010

(51) Int. Cl.
  H04B 1/26 (2006.01)
  H04B 1/10 (2006.01)
  H04B 1/28 (2006.01)
  H04B 1/403 (2015.01)

(52) U.S. Cl.
  CPC ............... H04B 1/1027 (2013.01); H04B 1/28 (2013.01); H04B 1/406 (2013.01)

(58) Field of Classification Search
  CPC ......... H04B 1/1027; H04B 1/28; H04B 1/406
  USPC ................. 455/230, 296–312, 313, 323, 333, 455/127.5, 136, 189.1, 190.1, 231, 522, 455/574; 701/468
  See application file for complete search history.

(56) References Cited

U.S. PATENT DOCUMENTS

| | | | |
|---|---|---|---|
| 4,944,025 A * | 7/1990 | Gehring et al. | 455/207 |
| 5,548,533 A | 8/1996 | Gao et al. | |
| 6,194,967 B1 | 2/2001 | Johnson et al. | |
| 6,392,492 B1 | 5/2002 | Yuan | |
| 6,417,737 B1 * | 7/2002 | Moloudi et al. | 330/301 |
| 6,442,375 B1 | 8/2002 | Parmentier | |
| 6,442,380 B1 * | 8/2002 | Mohindra | 455/234.1 |
| 6,498,926 B1 | 12/2002 | Ciccarelli et al. | |
| 6,529,164 B1 | 3/2003 | Carter | |
| 6,577,855 B1 * | 6/2003 | Moore et al. | 455/324 |
| 6,587,000 B2 | 7/2003 | Oikawa | |
| 6,694,131 B1 | 2/2004 | Lakkis | |
| 6,738,605 B1 | 5/2004 | Gilberton et al. | |
| 6,765,448 B2 | 7/2004 | Wu et al. | |
| 6,978,125 B2 * | 12/2005 | Lindell et al. | 455/183.1 |
| 7,010,270 B1 | 3/2006 | Thomas et al. | |
| 7,113,044 B2 | 9/2006 | Wang | |
| 7,116,958 B1 | 10/2006 | Brown et al. | |
| 7,194,050 B2 * | 3/2007 | Nicholls et al. | 375/346 |
| 7,283,851 B2 | 10/2007 | Persico et al. | |

(Continued)

FOREIGN PATENT DOCUMENTS

| | | |
|---|---|---|
| EP | 1453216 | 9/2004 |
| GB | 2339093 | 3/2003 |

(Continued)

OTHER PUBLICATIONS

Aparin, et al.: "A fully-integrated highly linear zero-IF CMOS cellular CDMA receiver," IEEE International Solid-State Circuits Conference 2005, Digest of Technical Papers, pp. 324-601 vol. 1, Feb. 10, 2005.

(Continued)

Primary Examiner — Richard Tan
(74) Attorney, Agent, or Firm — Howard Seo

(57) ABSTRACT

Methods and apparatuses are provided for dynamic frequency scaling of an intermediate frequency (IF) signal within a radio device.

66 Claims, 5 Drawing Sheets

(56) References Cited

U.S. PATENT DOCUMENTS

| | | | |
|---|---|---|---|
| 7,312,651 B2 | 12/2007 | Kudo | |
| 7,323,945 B2* | 1/2008 | Cyr et al. | 331/16 |
| 7,420,419 B2 | 9/2008 | Hori | |
| 7,453,396 B2 | 11/2008 | Levin et al. | |
| 7,529,322 B2* | 5/2009 | Mak et al. | 375/340 |
| 7,535,413 B2 | 5/2009 | Leinonen et al. | |
| 7,580,692 B2* | 8/2009 | Kravets | 455/302 |
| 7,835,718 B2 | 11/2010 | Oba et al. | |
| 7,890,076 B2 | 2/2011 | Mattisson et al. | |
| 7,949,319 B2* | 5/2011 | Tuttle et al. | 455/189.1 |
| 2003/0027534 A1 | 2/2003 | Swazey | |
| 2003/0216128 A1 | 11/2003 | Zhou | |
| 2004/0061646 A1 | 4/2004 | Andrews et al. | |
| 2004/0218576 A1* | 11/2004 | Imagawa et al. | 370/342 |
| 2005/0134336 A1 | 6/2005 | Goldblatt et al. | |
| 2005/0143040 A1 | 6/2005 | Kerth et al. | |
| 2006/0003722 A1 | 1/2006 | Tuttle et al. | |
| 2006/0009177 A1 | 1/2006 | Persico et al. | |
| 2006/0030266 A1 | 2/2006 | Desai et al. | |
| 2006/0116085 A1* | 6/2006 | Borremans et al. | 455/91 |
| 2006/0189286 A1 | 8/2006 | Kyu et al. | |
| 2006/0232465 A1 | 10/2006 | Levin et al. | |
| 2006/0276159 A1 | 12/2006 | Roufoogaran | |
| 2007/0033618 A1 | 2/2007 | Kiukkonen et al. | |
| 2007/0076813 A1* | 4/2007 | Haartsen | 375/285 |
| 2008/0261548 A1 | 10/2008 | Krone | |
| 2009/0203338 A1* | 8/2009 | Darabi | 455/226.2 |
| 2009/0239489 A1* | 9/2009 | Kaczman et al. | 455/226.1 |
| 2010/0130156 A1* | 5/2010 | Jin et al. | 455/296 |
| 2010/0205639 A1 | 8/2010 | Vavelidis et al. | |
| 2011/0037518 A1 | 2/2011 | Lee et al. | |
| 2011/0270418 A1 | 11/2011 | Law et al. | |
| 2011/0300914 A1 | 12/2011 | Gudem et al. | |
| 2012/0231729 A1 | 9/2012 | Xu et al. | |
| 2014/0097905 A1 | 4/2014 | XU; Yang et al. | |
| 2014/0099885 A1 | 4/2014 | XU; Yang et al. | |

FOREIGN PATENT DOCUMENTS

| | | |
|---|---|---|
| JP | 8321789 A | 12/1996 |
| JP | 2005192018 A | 7/2005 |
| JP | 2006020035 A | 1/2006 |
| JP | 2006121160 A | 5/2006 |
| JP | 2006311353 A | 11/2006 |
| KR | 1020010031383 | 11/2006 |
| RU | 2158474 C2 | 10/2000 |
| WO | WO9710644 | 3/1997 |
| WO | WO0003491 | 1/2000 |
| WO | WO0011795 | 3/2000 |
| WO | WO0243259 | 5/2002 |
| WO | 2005106523 A1 | 11/2005 |
| WO | 2009056150 A1 | 5/2009 |

OTHER PUBLICATIONS

Aparin et al: "Modified derivative superposition method for linearizing FET low noise amplifiers" Radio Frequency Integrated Circuits (RFOC) Symposium, 2004. Digest of Papers. 2004, Piscataway, NJ, USA, IEEE, Jun. 6, 2004, pp. 105-108, XP010714259.

International Search Report and Written Opinion—PCT/US2010/033592, International Search Authority—European Patent Office—Aug. 4, 2010.

International Search Report—PCT/US2008/054461, International Searching Authority—European Patent Office—Sep. 17, 2008.

Karanicolas, A.N.: "A 2.7-V 900-MHz CMOS LNA and Mixer," IEEE Journal of Solid-State Circuits, vol. 31, Issue 12, pp. 1939-1944, Dec. 1996.

Lee, T.: "The Design of CMOS-Radio-Frequency Integrated Circuits," Cambridge University Press, pp. 308-343, ISBN: 0521835399, First Edition 1998.

Partial International Search Report—PCT/US2008/054461, International Searching Authority—European Patent Office, Jul. 17, 2008.

Shaeffer, et al.: "A 1.5-V, 1.5-GHz CMOS Low Noise Amplifier," IEEE Journal of Solid-State Circuits, vol. 32, Issue 5, pp. 745-759, May 1997.

Written Opinion—PCT/US2008/054461, International Searching Authority—European Patent Office—Sep. 17, 2008.

Xu L. et al., "A Low-If CMOS Simultaneous GPS Receiver Integrated in a Multimode Transceiver", Custom Integrated Circuits Conference, IEEE, 2007, pp. 107-110, XP031223552.

Taiwan Search Report—TW099114440—TIPO—Feb. 16, 2013.

\* cited by examiner

RADIO DEVICE HAVING DYNAMIC INTERMEDIATE FREQUENCY SCALING

BACKGROUND

1. Field

The subject matter disclosed herein relates to electronic devices, and more particularly to methods and apparatuses for use in a radio device.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information. Indeed, it is not uncommon for some devices to be enabled to communicate with more than one wireless communication system and this trend appears to be growing.

Another popular and increasingly important wireless technology includes navigation systems and in particular satellite positioning systems (SPS) such as, for example, the global positioning system (GPS) and other like Global Navigation Satellite Systems (GNSS). SPS radios, for example, may receive wireless SPS signals that are transmitted by a plurality of orbiting satellites of a GNSS. The SPS signals may, for example, be processed to determine a global time, a range or pseudorange, an approximate or accurate geographical location, altitude, and/or speed associated with a device having the SPS radio.

SUMMARY

Methods and Apparatuses are provided for dynamic frequency scaling of an intermediate frequency (IF) signal within a radio device.

In accordance with one exemplary aspect, a method may be provided that includes receiving an RF signal, and based, at least in part, on an environment parameter, selectively frequency down-converting the received RF signal to either a corresponding first intermediate frequency (IF) signal having a first center frequency, or a corresponding second IF signal having a second center frequency, wherein the second center frequency is greater than the first center frequency. Here, the environment parameter may be related to an environment internal and/or external to a device.

For example, in certain implementations, the method may include frequency down-converting the received RF signal to the corresponding first IF signal if the environment parameter is less than a threshold parameter, and/or frequency down-converting the received RF signal to the corresponding second IF signal if the environment parameter is equal to or greater than the threshold parameter. In some example implementations, the threshold parameter may be programmably and/or dynamically established, and/or at least one of the first center frequency and/or the second center frequency is programmably and/or dynamically established in certain example implementations, the method may include accessing a first local oscillator (LO) signal operatively enabled for use in frequency down-converting the received RF signal to the corresponding first IF signal, accessing a second LO signal operatively enabled for use in frequency down-converting the received RF signal to the corresponding second IF signal.

In accordance with another exemplary aspect, an apparatus may be provided that includes a receiver circuit operatively enabled to receive an RF signal and, based, at least in part, on an environment parameter, selectively frequency down-convert the received RF signal to either a corresponding first IF signal having a first center frequency, or a corresponding second IF signal having a second center frequency, wherein the second center frequency is greater than the first center frequency.

In accordance with yet another exemplary aspect, an apparatus may be provided that includes means for receiving an RF signal, and means for selectively frequency down-converting the received RF signal to either a corresponding first IF signal having a first center frequency, or a corresponding second IF signal having a second center frequency based, at least in part, on an environment parameter, and wherein the second center frequency is greater than the first center frequency.

In accordance with still another exemplary aspect, an article of manufacture may be provided that includes a computer readable medium having stored thereon. The computer implementable instructions, if implemented by one or more processing units, may operatively enable the processing unit(s) to access an environment parameter, and based, at least in part, on the environment parameter, selectively enable a receiver circuit operatively enabled to receive an RF signal to frequency down-convert the received RF signal to either a corresponding first IF signal having a first center frequency, or a corresponding second IF signal having a second center frequency, wherein the second center frequency is greater than the first center frequency.

In accordance with an aspect of the present description, an IF frequency may be selectively changed (even dynamically changed) in response to a wireless signaling environment and/or device operating modes. In the presence of a potential jamming wireless signal, the IF frequency may, for example, be increased to possibly avoid excessive SPS receiver desense due to jamming signal distortion (e.g., IM2 distortion). In the absence of such a jamming wireless signal, the IF frequency may be decreased to reduce power consumption, for example, in certain baseband circuitry.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Methods and Apparatuses are provided for dynamic frequency scaling of an intermediate frequency (IF) signal within a radio device. The frequency of an IF signal may, for example, be scaled up or down in response to one or more "environment parameters". By way of example, an environment parameter may be associated with one or more wireless signals within the environment internal and/or external to the radio device. Such wireless signals may emanate from within the radio device itself and/or from one or more other devices. It may be useful to scale the center frequency of an IF signal to provide improved performance in such a wireless environment. In another example, an environment parameter may be associated with one or more operating modes associated with the device. It may be useful to scale the center frequency of an IF signal to provide better support for one or more operating modes.

Figure 1:
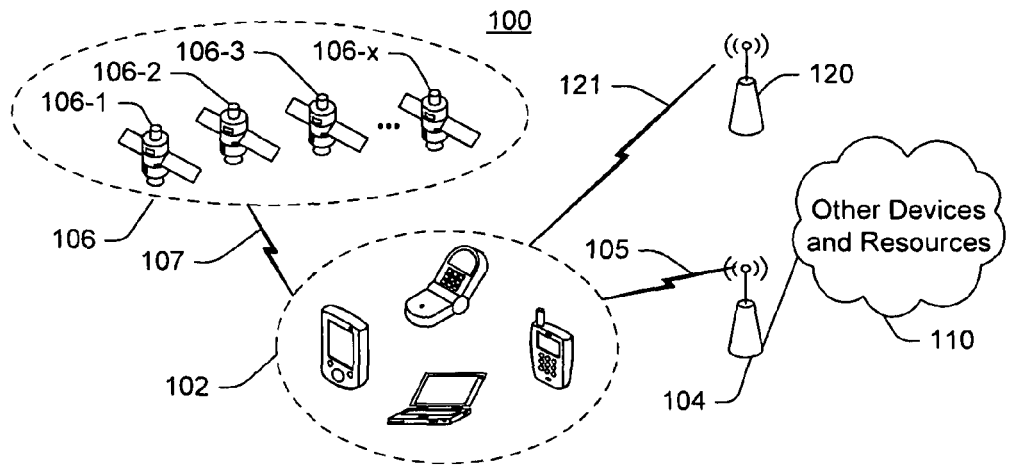
FIG. 1 is block diagram illustrating an exemplary environment that includes a device having at least one radio operatively enabled to provide dynamic intermediate frequency scaling in accordance with an implementation.

FIG. 1 is a block diagram illustrating an exemplary environment 100 that includes a device 102 having at least one radio operatively enabled to provide dynamic intermediate frequency scaling in accordance with certain exemplary implementations of the present description.

Wireless environment 100 may be representative of any system(s) or a portion thereof that may include at least one device 102 enabled to transmit and/or receive wireless signals to/from at least one wireless system 104. Device 102 may, for example, include a mobile device or a device that while movable is primarily intended to remain stationary. Thus, as used herein, the terms "device" and "mobile device" may be used interchangeably as each term is intended to refer to any single device or any combinable group of devices that may transmit and/or receive wireless signals.

With this in mind and by way of example but not limitation, as illustrated using icons in FIG. 1, device 102 may include a mobile device such as a cellular phone, a smart phone, a personal digital assistant, a portable computing device, a navigation device, and/or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively enabled for use in another device.

Regardless of the form of device 102, device 102 may include at least one radio operatively enabled to provide dynamic intermediate frequency scaling. The term "radio" as used herein refers to any circuitry and/or the like that may be enabled to receive wireless signals and/or transmit wireless signals. In certain implementations, two or more radios may be enabled to share a portion of circuitry and/or the like (e.g., a processing unit, memory, antenna, etc.).

By way of example but not limitation, in some of the examples presented herein device 102 may include a first radio that is enabled to receive wireless signals associated with at least one navigation system 106 (e.g., a satellite positioning system, and/or the like), and a second radio that is enabled to receive and/or transmit wireless signals associated with at least one wireless system 104. Wireless system 104 may include, for example, a wireless communication system, such as, e.g., a wireless telephone system, a wireless local area network, and/or the like. Wireless system 104 may include, for example, a wireless broadcast system, such as, e.g., a television broadcast system, a radio broadcast system, and/or the like. In certain implementations, device 102 may be enabled only to receive wireless signals from wireless system 104, while in other implementations mobile station 102 may be enabled only to transmit wireless signals to wireless system 104.

As illustrated in FIG. 1, wireless system 104 may be enabled to communicate with and/or otherwise operatively access other devices and/or resources as represented simply by cloud 110. For example, cloud 110 may include one or more communication devices, systems, networks, or services, and/or one or more computing devices, systems, networks, or services, and/or the like or any combination thereof.

Wireless system 104 may, for example, be representative of any wireless communication system or network that may be enabled to receive and/or transmit wireless signals. By way of example but not limitation, wireless system 104 may include a wireless wide area network (WWAN), a wireless local area network (WLAN), a wireless personal area network (WPAN), a wireless metropolitan area network (WMAN), a Bluetooth communication system, WiFi communication system, Global System for Mobile communications (GSM) system, Evolution Data Only/Evolution Data Optimized (EVDO) communication system, Ultra Mobile Broadband (UMB) communication system, Long Term Evolution (LTE) communication system, Mobile Satellite Service-Ancillary Terrestrial Component (MSS-ATC) communication system, and/or the like.

The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Such location determination techniques described herein may also be used for any combination of WWAN, WLAN, WPAN, WMAN, and/or the like.

Wireless system 104 may, for example, be representative of any wireless broadcast system that may be enabled to at least transmit wireless signals. By way of example but not limitation, a wireless broadcast system may include a MediaFLO system, a Digital TV system, a Digital Radio system, a Digital Video Broadcasting-Handheld (DVB-H) system, a Digital Multimedia Broadcasting (DMB) system, an Integrated Services Digital Broadcasting-Terrestrial (ISDB-T) system, and/or other like systems and/or related broadcast techniques.

Device 102 may be enabled to at least receive wireless signals from at least one navigation system 106 which is illustrated in FIG. 1 as a satellite positioning system (SPS) having a plurality of SPS signal transmitting satellites 106-1, 106-2, 106-3, ..., 106-x. Those skilled in the art will recognize that navigation system 106 may include additional transmitting and/or other supporting resources in addition to or instead of the satellites as illustrated.

In certain implementations, navigation system 106 may be enabled to provide other non-navigation related services (e.g., communication services, or the like). As such, in certain implementations device 102 may be enabled to transmit wireless signals to navigation system 106.

The space vehicles (SVs) of navigation system 106 may each be enabled to transmit a unique SPS signal of which, at least a portion, may be received by device 102 and used in some manner for navigation, for example, to determine a time, a range, a location, a position, etc. The specific navigation signaling and location determining techniques may vary depending on the navigation system(s) being used. Such SVs may be enabled to transmit one or more signals at the same and/or at different carrier frequencies. For example, a GPS satellite may be enabled to transmit L1 C/A and L1C signals in the same band, as well as, the L2C and L5 signals at other carrier frequencies, etc. Furthermore, such SPS signals may include encrypted signals.

A SPS typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting SVs. For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit SPS and/or SPS-like signals that may also be interfered with by certain wireless communication signals, etc. Thus, as used herein an SPS may include any combination of one or more global and/or regional navigation satellite systems and/or augmentation systems, and SPS signals may include SPS, SPS-like, and/or other signals associated with such one or more SPS.

To estimate its location, device 102 may determine pseudorange measurements to SVs that are "in view" of its receiving radio using well known techniques based, at least in part, on detections of PN codes in signals received from the SVs. Such a pseudorange to a SV may be determined based, at least in part, on a code phase detected in a received signal marked with a PN code associated with the SV during a process of acquiring the received signal at the receiving radio. To acquire the received signal, device 102 may, for example, be enabled to correlate the received signal with a locally generated PN code associated with a SV. For example, device 102 may correlate such a received signal with multiple code phase and/or Doppler frequency shifted versions of such a locally generated PN code. Detection of a particular code phase and/or Doppler frequency shifted version yielding a correlation result with the highest signal power may indicate a code phase associated with the acquired signal for use in measuring pseudorange as discussed above.

Thus, in certain implementations, device 102 may be enabled to determine its location in such a manner or other like manner without additional support from other devices or resources. In other implementations, however, device 102 may be enabled to operate in some manner with one or more other devices or resources, as for example represented by cloud 110 connected to wireless system 104, to determine its location and/or to support other navigation related operations. Such navigation techniques are well known.

In certain implementations, device 102 may be enabled to receive SPS signals from one or more GNSSs, such as, for example, GPS, Galileo, GLONASS, Compass, or other like system that uses a combination of these systems, or any SPS developed in the future, each referred to generally herein as a SPS. As used herein, an SPS will also be understood to include pseudolite systems.

Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites may be useful in situations where signals from an orbiting SV might be unavailable, such as in tunnels, mines, buildings, urban canyons or other enclosed areas. Another implementation of pseudolites is known as radio-beacons. The terms "satellite" and "SV", as used herein, are interchangeable and intended to include pseudolites, equivalents of pseudolites, and possibly others. The term "SPS signals", as used herein, is intended to include SPS-like signals from pseudolites or equivalents of pseudolites.

A receiver circuit within device 102 may be enabled to acquire a wireless signal. For example, a receiver circuit may receive a wireless signal (e.g., radio frequency (RF) signal) and down-convert the RF signal to a corresponding intermediate frequency (IF) signal and then further process the intermediate signal (if needed) to identify information that may be included within the wireless signal. Such an IF signal may have a center frequency that is scaled in some manner, in accordance with an aspect of the present description, to account to certain environmental conditions and/or the operation of device 102. For example, environment 100 may include other devices such as transmitter 120 that may transmit (intentionally or unintentionally) wireless signals 121 that may interfere in some manner with device 102 as it attempts to acquire SPS signal 107. By selectively scaling (changing) the center frequency of the IF signal in the presence and/or absence of such a potential jamming signal(s), device 102 may improve performance in some manner. In other instances, device 102 may be operated in certain modes in which selective frequency scaling of the IF signal (up and/or down) may prove beneficial.

Figure 2:
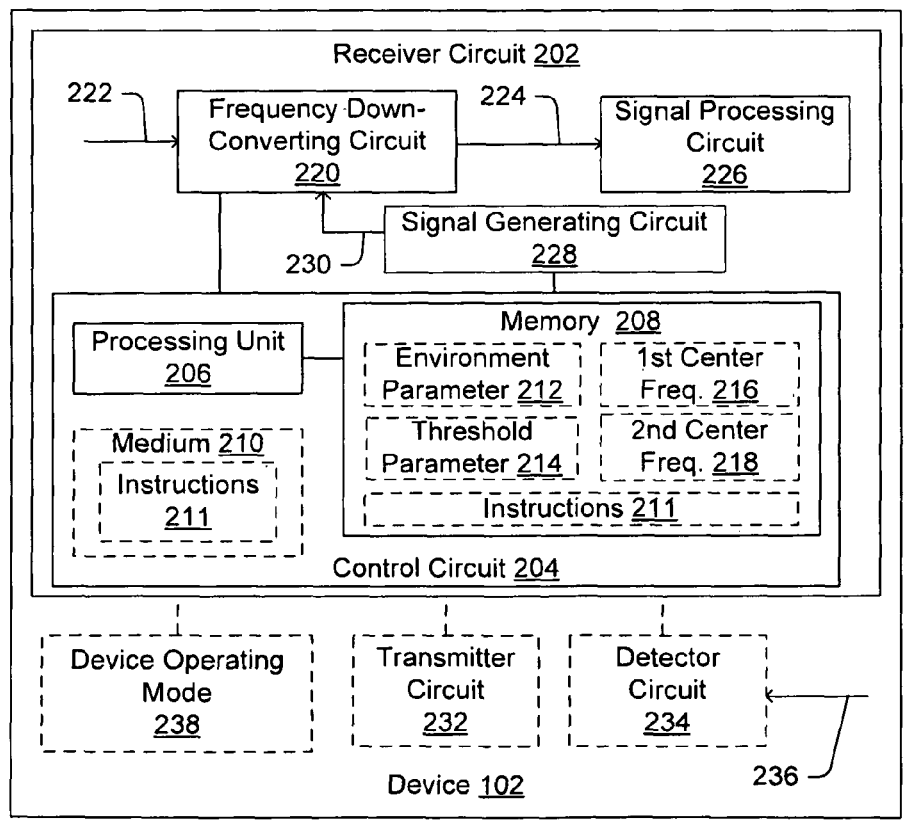
FIG. 2 is a block diagram illustrating certain features of an exemplary device that may, for example, be implemented in the environment of FIG. 1.

With this dynamic intermediate frequency scaling capability in mind, attention is drawn next to FIG. 2, which is a block diagram illustrating certain features of an exemplary device 102.

Device 102 may, for example, include at least one receiver circuit 202 that may be enabled to receive at least one RF signal 222. RF signal 222 may, for example, include an SPS signal, and/or the like.

Receiver circuit 202 may, for example, include and/or otherwise be operatively coupled to a control circuit 204. In FIG. 2 the control circuit is shown as being within the receiver circuit. In other implementations all or part of the control circuit may be outside of the receiver circuit.

As illustrated in this example, receiver circuit 202 may also include a frequency down-converting circuit 220, a signal generating circuit 228, and a signal processing circuit 226.

In this example, receiver circuit 202 may be enabled to selectively frequency down-convert received RF signal 222 to a corresponding intermediate frequency signal 224, based, at least in part, on an environment parameter 212. For example, based, at least in part, on environment parameter 212, receiver circuit 202 may be enabled to selectively frequency down-convert received RF signal 222 to either a corresponding first IF signal having a first center frequency, or a corresponding second IF signal having a second center frequency. Here, for example, the second center frequency may be greater than the first center frequency. The resulting IF signal 224 may then be further processed in some manner by signal processing circuit 226. It is noted for clarification that the use of "first IF signal" and "second IF signal" as used herein is not intended to describe initial and subsequent signals, for example as might occur in a typical two-stage receiver design.

In this example implementation, the selective frequency down-conversion process may be orchestrated by control circuit 204, which may initiate, indicate, and/or otherwise operatively establish the selected IF frequency to frequency down-converting circuit 220 and/or signal generating circuit 228.

As illustrated in this example, control circuit 204 may include one or more processing units 206 and memory 208. In certain implementations, an article of manufacture may be accessed by control circuit 204 and may include a computer readable medium 210 upon which computer implementable instructions 211 may be stored.

Here, for example, processing unit 206 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Memory 208 may include any type of memory that may be enabled to store information in the form of data. Some examples include a random access memory (RAM), a read only memory (ROM), a static memory, a dynamic memory, etc. Such stored information may include, for example, instructions 211 that may be implemented by processing unit 206, and/or data associated with communications, location signals, measurements, parameters, location data, and/or the like. Such information may be stored on computer readable medium 210 which may be operatively coupled to one or more of processing unit 206 and/or memory 208, for example. As illustrated in FIG. 2, for example, memory 208 may store data associated with environment parameter 212, a threshold parameter 214, a first center frequency 216, a second center frequency 218, and/or other like operational information. For example, memory 208 may also include data associated with one or more device operating modes 238.

By way of example but not limitation, computer readable medium 210 may be included in an article of manufacture and may include some form of memory, one or more optical data storage discs, one or more magnetic storage disks or tapes, etc.

In certain example implementations, receiver circuit 202 may be enabled to frequency down-convert RF signal 222 to a first IF signal if environment parameter 212 is less than threshold parameter 214, and a second IF signal if environment parameter 212 is equal to or greater than threshold parameter 214. By way of example but not limitation, signal generating circuit 228 may be enabled to generate a local oscillator (LO) signal 230 that may be used by frequency down-converting circuit 220 to frequency down-convert RF signal 222 to produce corresponding IF signal 224. Thus, in certain example implementations, signal generating circuit 228 may include circuitry that may be dedicated to generate a first LO signal for use in producing a first IF signal and additional circuitry that may be dedicated to generate a second LO signal for use in producing a second IF signal. In other example implementations, signal generating circuit 228 may be programmed to selectively generate either the first or the second LO signals, for example, based on and/or otherwise associated with first center frequency 216 or second center frequency 218, respectively.

Control circuit 204 may, for example, be configured to receive and/or otherwise establish environment parameter 212 based on information associated with at least one of transmitter circuit 232, a received wireless signal 236 (e.g., as identified here through a detector circuit 234), and/or device operating mode 238. By way of example but not limitation, in certain implementations environment parameters 212 may include or otherwise be associated with a transmitter power, a transmitter frequency (e.g., possibly coarse frequency information, band of operation, etc.), a transmitter bandwidth (e.g., as may be conveyed by a mode of operation such as 1× vs. WCDMA), and/or the like.

By way of example but not limitation, transmitter circuit 232 may be co-located with at least a portion of receiver circuit 202 as part of device 102. Indeed, in certain implementations portions of transmitter circuit 232 and receiver circuit 202 may be implemented via a transceiver circuit (not shown). Transmitter circuit 232 may be enabled to transmit wireless signal 105 (see FIG. 1), for example. In certain example implementations, environment parameter 212 may be established in some manner to identify an existing operation and/or expected operation of transmitter circuit 232. For example, if transmitter circuit 232 is, or is about to begin, transmitting wireless signal 105, then environment parameter 212 may be established accordingly. Here, for example, it may be beneficial to scale (e.g., switch) from a first IF signal to a second IF signal within receiver circuit 202 if transmitter circuit 232 is, or is about to begin, transmitting wireless signal 105. Conversely, it may be beneficial to switch from a second IF signal to a first IF signal within receiver circuit 202 if transmitter circuit 232 is not transmitting wireless signal 105.

In certain implementations, at least one threshold parameter 214 may be associated in some manner with transmitter circuit 232. For example, threshold parameter 214 may be associated with a threshold signal power level and environment parameter 212 may be associated with a signal power level at which transmitter circuit 232 may be transmitting (or may soon be transmitting) wireless signal 105. Hence, receiver circuit 202 may be enabled to frequency down-convert RF signal 222 to a first IF signal if environment parameter 212 is less than threshold parameter 214, or a second IF signal if environment parameter 212 is equal to or greater than threshold parameter 214.

By way of example but not limitation, detector circuit 234 may be co-located with at least a portion of receiver circuit 202 as part of device 102. Indeed, in certain implementations portions of detector circuit 234 and receiver circuit 202 may be implemented together and/or be of similar design (e.g., detector circuit 234 may be associated with a receiver, a transceiver, etc. (not shown)). Detector circuit 234 may be enabled to receive and/or otherwise detect the presence of wireless signal 236. For example, wireless signal 236 may include one or more of wireless signals 105 and/or 121 (see FIG. 1). In certain example implementations, environment parameter 212 may be established in some manner to identify an existing presence and/or expected presence of wireless signal 236. For example, if detector circuit 234 detects that wireless signals are being and/or may be transmitted then environment parameter 212 may be established accordingly. Here, for example, it may be beneficial to switch from a first IF signal to a second IF signal within receiver circuit 202 if detector circuit 234 detects that certain wireless signaling may occur. Conversely, it may be beneficial to switch from a second IF signal to a first IF signal within receiver circuit 202 if detector circuit 234 no longer detects or expects such wireless signaling to occur, e.g., in the immediate future. In certain implementations, threshold parameter 214 may be associated in some manner with detector circuit 234. For example, threshold parameter 214 may be associated with a threshold signal power level and environment parameter may be associated with a signal power level associated with wireless signaling within the environment that may adversely affect the performance of receiver circuit 202. Hence, receiver circuit 202 may be enabled to frequency down-convert RF signal 222 to a first IF signal if environment parameter 212 is less than threshold parameter 214, and a second IF signal if environment parameter 212 is equal to or greater than threshold parameter 214.

In another example, threshold parameter 214 may be associated with a maximum wireless signaling time period and environment parameter may be associated with a time measurement since wireless signaling was last detected. Here, receiver circuit 202 may be enabled to frequency down-convert RF signal 222 to a first IF signal if environment parameter 212 is greater than threshold parameter 214, and a second IF signal if environment parameter 212 is equal to or less than threshold parameter 214.

In other example implementations, threshold parameter 214 and/or environment parameter 212 may be associated with and/or identify certain frequencies, bands, channels, etc., associated with the wireless signaling that may be of interest when determining whether to scale the IF signal.

In certain example implementations, environment parameter 212 may be established in some manner to identify an existing and/or expected device operating mode 238. By way of example but not limitation, device operating mode 238 may be associated with at least one of a device power consumption mode, a device communication mode, and/or a device navigation mode. It may be beneficial, for example, to switch from a first IF signal to a second IF signal within receiver circuit 202 depending on the device operating mode 238. Thus, for example, if a device power consumption mode is intended to reduce power consumption then it may be beneficial to switch from a second IF signal to a first IF signal within receiver circuit 202. Conversely, if a device power consumption mode is intended to no longer reduce power consumption (e.g., device may have been connected to charging and/or other like power source) then it may be beneficial to switch from a first IF signal to a second IF signal within receiver circuit 202.

In another example, a device communication mode may identify pending transmission via transmitter circuit 232, and/or identify that the device may be communicating in accordance with a specific transmission and/or reception mode. For example, for an initiating, testing, emergency, and/or other like communication mode it may be beneficial to employ a specific IF signal within receiver circuit 202. In still another example, a device navigation mode may identify that the device may be operating in accordance with a specific navigation mode in which case it may be beneficial to select a specific IF signal within receiver circuit 202.

In certain implementations, control circuit 204 may consider a variety of environment parameters 212 and/or threshold parameters 214, for example, according to one or more algorithms or formulas to determine whether and/how to scale the frequency of an IF signal 224.

Figure 3:
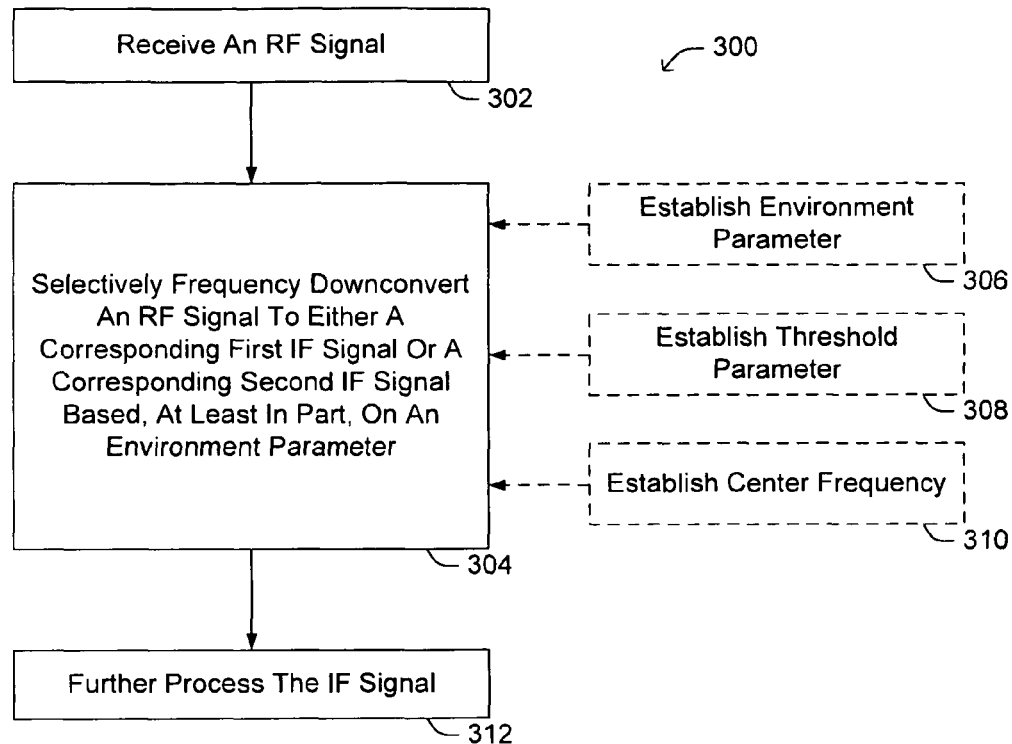
FIG. 3 is a flow diagram illustrating a method that may, for example, be implemented in the environment of FIG. 1 and/or device of FIG. 2.

Attention is drawn next to FIG. 3, which illustrates an exemplary method 300 that may be implemented to scale the IF frequency of a received a wireless signal. Method 300 may, for example, include at block 302 initially receiving at least one RF signal. At block 304, method 300 may include selectively frequency down-converting the received RF signal to a corresponding IF signal having a selected center frequency within a range of frequencies and/or a plurality of frequencies. For example, at block 304, method 300 may include selectively frequency down-converting the received RF signal to either a corresponding first IF signal having a first center frequency, or a corresponding second IF signal having a second center frequency based, at least in part, on at least one environment parameter. Here, for example, the second center frequency may be greater than the first center frequency.

As illustrated at block 306, the environment parameter may be established. The environment parameter may, for example, be programmably and/or dynamically established. Environment parameter 212 (see FIG. 2) may, for example, be associated with transmitter circuit that may be co-located in device 102 which also includes receiver circuit 202 enabled to receive RF signal 222 in accord with block 302. Environment parameter 212 may, for example, be associated with received wireless signal 236 which may be detected and/or otherwise received by detector circuit 234. Environment parameter 212 may, for example, be associated with at least one device operating mode 238 such as, e.g., a device power consumption mode, a device communication mode, a device navigation mode, and/or other like device operating modes.

In certain example implementations, block 304 may include frequency down-converting the received RF signal to the corresponding first IF signal if the environment parameter is less than a threshold parameter, or frequency down-converting the received RF signal to the corresponding second IF signal if the environment parameter is equal to or greater than the threshold parameter. Conversely, in other example implementations, block 304 may include frequency down-converting the received RF signal to the corresponding first IF signal if the environment parameter is equal to or greater than a threshold parameter, or frequency down-converting the received RF signal to the corresponding second IF signal if the environment parameter is less than the threshold parameter.

As illustrated at block 308, the threshold parameter may, for example, be programmably and/or dynamically established. As illustrated at block 310, at least one of the first center frequency and/or the second center frequency may, for example, be programmably and/or dynamically established. In certain exemplary implementations, the first center frequency may be between 0 Hz and 100 KHz. In certain exemplary implementations, the second center frequency may be greater than 0 Hz.

Block 304 may, for example, include accessing a first LO signal enabled for use in frequency down-converting the received RF signal to the corresponding first IF signal, and/or accessing a second LO signal enabled for use in frequency down-converting the received RF signal to the corresponding second IF signal. In certain implementations, block 304 may include establishing either the first LO signal and/or the second LO signal. By way of example, either the first LO signal and/or the second LO signal may be established, at least in part, using dedicated signal generating circuits and/or the like. In other example implementations, the first LO signal and/or the second LO signal may be established, at least in part, using a programmable signal generating circuit and/or the like (e.g., a phase-locked loop (PLL) that may be programmed to selected frequencies, etc.).

Figure 4:
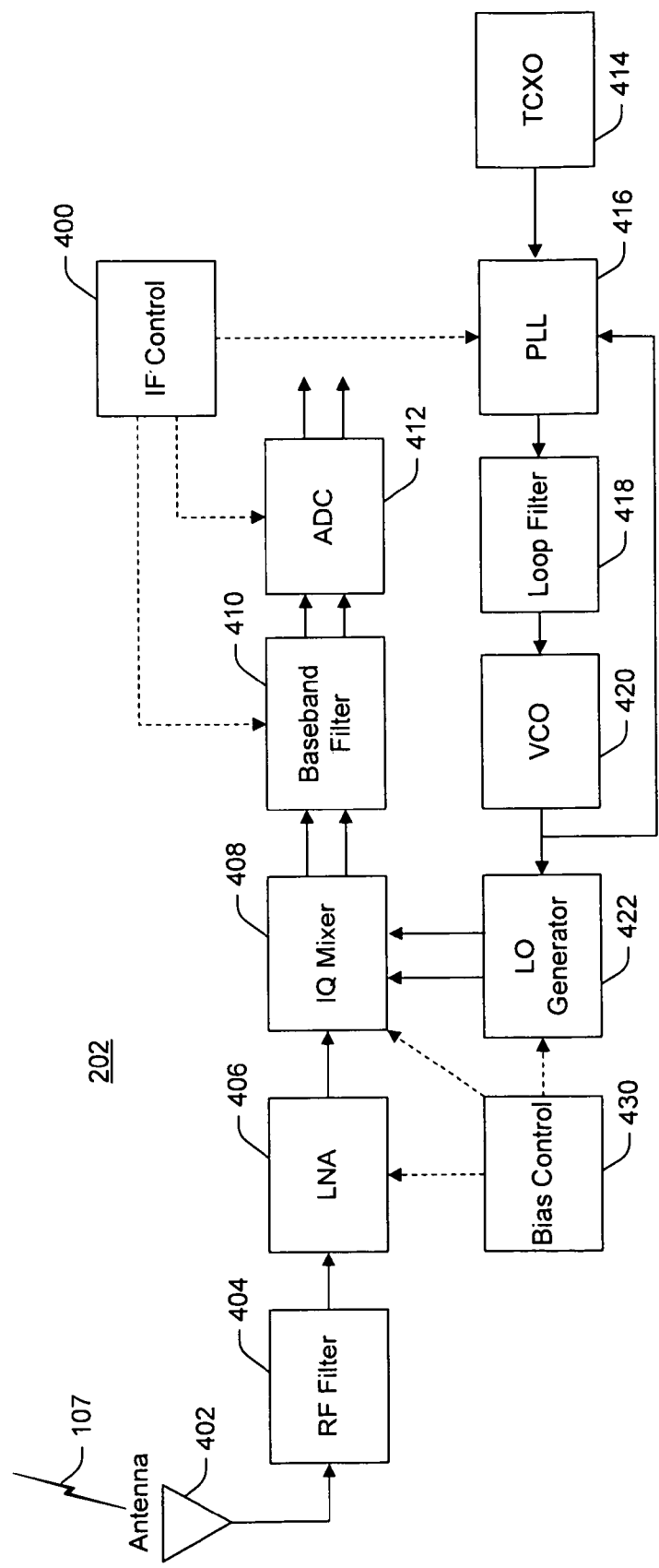
FIG. 4 is a block diagram illustrating certain features of an exemplary receiver circuit that may, for example, be implemented in the environment of FIG. 1 and/or device of FIG. 2.

Reference is made next to FIG. 4, which is a block diagram illustrating certain features of an exemplary receiver circuit 202 that may, for example, be implemented in the environment of FIG. 1 and/or device of FIG. 2.

Receiver circuit 202 as illustrated in FIG. 4 has a digital low IF (LIF) architecture, with a single I/Q down-conversion stage and dual-channel ADC to digitize I and Q analog signals. The analog I/Q signals may, for example, include bandpass signals with nonzero center frequency. Final down-conversion to 0 Hz (if needed) may, for example, be implemented within signal processing circuit 226 (see FIG. 2).

In this example implementation, the architecture may be enabled to degenerate to a zero IF (ZIF) receiver in the case where the IF frequency equals 0 Hz. From an RF/analog architecture standpoint, in certain instances a very low IF frequency (e.g., up to tens of kHz or even perhaps greater than 100 kHz) may not be significantly different from an IF frequency of exactly 0 Hz. References to ZIF operation herein may thus include such very low IF frequencies.

In accordance with an aspect of the present description, the IF frequency may be selectively changed (even dynamically changed) in response to the wireless signaling environment and/or device operating modes. In the presence of a potential jamming wireless signal, the IF frequency may, for example, be increased to possibly avoid excessive SPS receiver desense due to jamming signal distortion (e.g., IM2 distortion). In the absence of such a jamming wireless signal, the IF frequency may be decreased to reduce power consumption, for example, in certain baseband circuitry.

Those skilled in the art should recognize that, given an amplitude (and possibly phase) modulated jamming signal $a_j(t)\cos(\omega_j t+\theta_j(t))$ at the receiver input, for example, an IM2 distortion may be identified with a term at the down-converting circuit output that may be proportional to $a_j(t)^2$. IM2 distortion may be produced by one or a combination of several circuit mechanisms. A direct mechanism may be the inherent second order nonlinearity of FET switches that may be included in a mixer core, and/or possibly exacerbated by transistor mismatch. Another mechanism may be coupling of the jamming signal from an input port of a mixer to a LO port, resulting possibly in jamming signal self-mixing. Another exemplary possibility may be that in down-conversion a jamming signal's second harmonic may be generated by LNA nonlinearity; e.g., if a LO duty cycle is not exactly 50 percent, it too may have a second harmonic component that down-converts (e.g., to baseband) the high frequency term in an LNA output.

The jamming signal of principal concern in certain example implementations may include a transmitter circuit (e.g., cellular, etc.) that may be co-located with the receiver circuit (e.g., SPS receiver) within the device. For example, in certain device operating modes, it may be desirable to operate the SPS receiver simultaneously with the cellular transceiver. Such operation may, however, pose an especially difficult problem in a frequency division duplex (FDD) system such as CDMA2000, wherein the transmitter circuit may be radiating continuously while in a connected state. Unfortunately, in many designs, a fraction of the output power may couple into the SPS receiver circuit which may degrade performance.

Comparing FIG. 2 to FIG. 4, receiver circuit 202 is illustrated as an exemplary SPS receiver in which control circuit 204 (FIG. 2) may be implemented, at least in part, by IF control 400 of FIG. 4. Also, signal generating circuit 228 (FIG. 2) may be implemented, at least in part, by the arrangement circuits such as TCXO 414, PLL 416, Loop filter 418, VCO 420, and/or LO generator 422.

PLL 416 may be enabled to provide a timing signal to loop filter 418. Loop filter 418 in turn provides a tuning signal to VCO 420 which may be enabled to provide feedback to PLL 416 and also a timing signal to LO generator 422. LO generator 422 may be enabled to provide I and Q LO signals to IQ mixer 408.

Here, for example, TCXO 414 may be enabled to provide a timing signal to PLL 416. TCXO 414 is meant to be inclusive of a variety of reference oscillator types. For example, the reference may have a frequency tuning control (VCTCXO), or it may be a simpler crystal oscillator (XO) with neither frequency control nor temperature compensation circuits.

In FIG. 4, SPS signal 107 may be received via antenna 402. Antenna 402 may be coupled to provide the received SPS signal as input signal to an RF filter 404 that may be enabled to attenuate energy outside the received SPS signal. RF filter 404 may be coupled to a low noise amplifier (LNA) 406 that may be enabled to amplify the received SPS signal. LNA 406 may be coupled to IQ mixer 408 which may be coupled to baseband filter (BBF) 410 and LO generator 422. IQ mixer 408 may be enabled to down-convert the RF signal from LNA 406 to corresponding I and Q IF signals in accordance with the LO signal(s) from LO generator 422. BBF 410 may then further remove out-of-band energy from the I and Q IF signals which may then be digitized by analog to digital converter (ADC) 412. The corresponding digital I and Q data from ADC 412 may then be further processed in some manner by signal processing circuit 226 (FIG. 2). For example, signal processing circuit 226 may be enabled to process SPS signals accordingly to support at least the determination of location and/or navigation information.

IF control 400 may be enabled to selectively control and/or otherwise program BBF 410, ADC 412, and/or PLL 416, for example, based upon environment parameter 212 (see FIG. 2). For example, environment parameter 212 may be based on information about instantaneous transmitter output power associated with transmitter circuit 232 (FIG. 2). By way of example but not limitation, in certain chipsets that tightly integrate the SPS receiver with the cellular transceiver, such information may be readily available to software that controls the SPS receiver.

IF control 400 may be implemented through hardware, firmware, software, and/or a combination thereof. Programmable controls in the BBF, ADC, and PLL blocks may be exposed to a processing unit, for example, via registers, etc. within an integrated circuit.

Also shown in FIG. 4, receiver circuit 202 may include (optional) a bias control 430 that may be enabled to provide for dynamic bias scaling. Here, for example, bias control 430 may be enabled to adjust certain RF circuit parameters (e.g., LNA IP3, LO phase noise floor) to be robust in the presence of a strong jamming signal, and in the absence of such a jamming signal may re-adjust such parameters to reduce power consumption.

Bias control 430 may, for example, represent a central bias generation that provides bias current/voltage to LNA 406, IQ mixer 408, and LO generator 422. Here, for example, LNA 406, IQ mixer 408, and LO generator 422 may have local bias generation circuits. Bias control 430 may, for example, represent software (programmable) control of integrated circuit registers, and/or the like. All or part of bias control 430 may be included within control circuit 204 (FIG. 2), for example.

In certain implementations signal generating circuit 228 and frequency down-converting circuit 220 may include one or more switches (not shown) that may, for example, selectively determine a LO signal to use in frequency down-converting an RF signal to a corresponding IF signal. In other implementations, it may be desirable to have an implementation that may avoid the use of such switches or other like switching circuitry.

Figure 5:
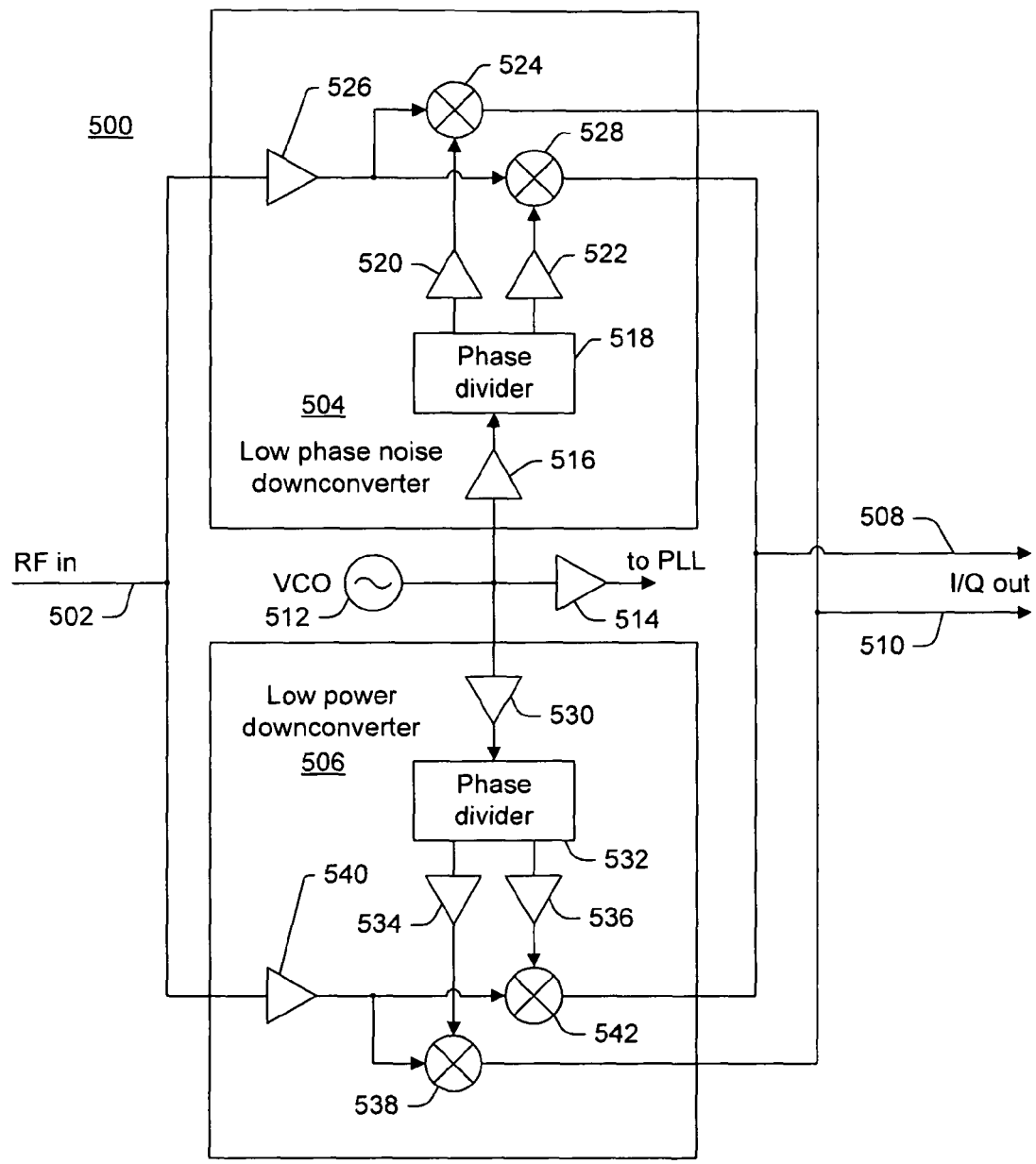
FIG. 5 is a schematic diagram illustrating certain portions of an exemplary receiver circuit that may, for example, be implemented in the environment of FIG. 1 and/or device of FIG. 2.

With this in mind and by way of further example, reference is now made to FIG. 5, which shows an example implementation of a portion of a frequency down-converting circuit 500 that may be implemented in receiver circuit 202 of FIG. 2.

As illustrated in FIG. 5, an RF signal 502 may be provided to a low phase noise down-converter 504 via buffer 526 and a low power down-converter 506 via buffer 540. Down-converters 504 and 506 may be coupled to a VCO 512 via buffers 516 and 530, respectively. VCO 512 may also be coupled to a PLL (not shown) via buffer 514. Down-converter 504 may include, for example, mixers 524 and 528 each being coupled to buffer 526. Down-converter 504 may include a phase divider 518 coupled to buffer 516 and providing corresponding signals to buffers 520 and 522, wherein buffer 520 is coupled to mixer 524 and buffer 522 is coupled to mixer 528. Down-converter 506 may include, for example, mixers 538 and 542 each being coupled to buffer 540. Down-converter 506 may include a phase divider 532 coupled to buffer 530 and providing corresponding signals to buffers 534 and 536, wherein buffer 534 is coupled to mixer 538 and buffer 536 is coupled to mixer 542. An I output 508 may be provided by mixer 528 or 542, and a Q output 510 may be provided by mixer 524 or 538.

The output RF signal 502 of the LNA (not shown) may be provided to both down-converters through separate buffers 526 and 540, with only one buffer 526 or 540 being active at any point in time. The non-active buffer 526 or 540 may present a high impedance to the LNA. Similarly, the output of the VCO 512 may be provided to both down-converters through separate buffers 516 and 530, with only one buffer 516 or 530 being active at any point in time. Here, for example, the non-active buffer 516 or 530 may be configured to minimize loading of VCO 512. Additionally, the output of VCO 512 may be provided to the PLL (not shown) via buffer 514.

The outputs of the mixers may be tied together and/or provided to baseband filter circuits (not shown), for example. In its non-active state, the output of an RF input buffer 526 or 540 may be configured in a high impedance state to minimize the additional load presented to the output of the active down-converter.

Besides the cellular transmitter(s), other transmitters may be co-located with the SPS receiver and present similar difficulties during simultaneous operation. Examples of other transmitters and possible sources for jamming signals include Bluetooth and 802.11 wireless LAN. In chipsets that integrate such transceiver(s) with an SPS receiver, information about transmitter output power may be available to software that controls the SPS receiver.

As mentioned, in certain implementations, the selected IF signal frequency may influence power consumption within a device. For example, after down-conversion, certain analog circuits may be enabled to filter and amplify the baseband signal before passing it to the ADC. Assuming a fixed baseband gain requirement, the DC current required by such circuits tends to increase with bandwidth. Thus, at higher bandwidths, a higher device $\omega_T$ may be necessary to produce the required signal gain, and higher $\omega_T$ may be achieved by increasing bias current. For an exemplary CMOS FET implementation in a long channel approximation, the device $\omega_T$ may be proportional to ($\propto$) the device transconductance, and the device transconductance may be proportional to the square root of the bias current. For an SPS signal with bandwidth B, the maximum frequency component of the signal at the down-converting circuit output may be $f_m = f_{IF} + B/2$. Thus, for example, if $\omega_T \propto f_m$, then it may be that $I_{DC} \propto f_m^2 = O(f_{IF}^2)$. Note that this quadratic growth of bias current with IF frequency may become a linear relationship for short channel devices. While an exact mathematical relationship between bias current and IF frequency may be implementation specific, it may be for most implementations that a bias current may increase as a function of IF frequency.

In certain example implementations, a DC current drain associated with ADC 412 operating at sufficiently high sampling frequencies may be dominated by dynamic switching current. Such current may, for example, increase linearly with the sampling frequency $f_s$. According to the well-known Nyquist criterion, to avoid aliasing distortion the sampling frequency should be greater than twice the maximum frequency component $f_m$ of the signal, here, at the input of ADC 412 (assuming the IF frequency is small enough to rule out subsampling architectures). Thus, a choice of IF frequency may clearly influence the required sampling frequency. A higher IF frequency may yield a baseband signal with higher maximum frequency component. For example, a higher IF frequency may use higher baseband signal frequency components, higher sampling frequency, and/or higher DC current.

For an SPS signal with bandwidth B, the maximum frequency component at the input of ADC 412 may be $f_m = f_{IF} + B/2$. Thus, a sampling frequency may need to satisfy $f_s > 2f_m = 2f_{IF} + B$. Consequently, the DC current may scale as $I_{DC} = O(f_s) = O(f_{IF})$.

In addition to ADC 412, other digital circuits (e.g., following ADC 412) may need to be clocked at the sampling rate, and as such may require a DC current that scales in direct proportion to the IF frequency. Furthermore, although a crossover point at which dynamic current may dominate the total current consumption of ADC 412 may occur at quite a high sampling frequency, that crossover point will be very low for CMOS digital circuits.

In addition to a possible increase in sampling frequency, other ADC related changes may be recommended when the IF frequency is increased. For example, in ZIF mode ADC 412 may have a lowpass sigma delta architecture, with quantization noise transfer function having a zero at DC. In LIF mode it may be advantageous to switch to a bandpass sigma delta architecture, shifting the zero in the noise transfer function into the signal passband.

Figure 7:
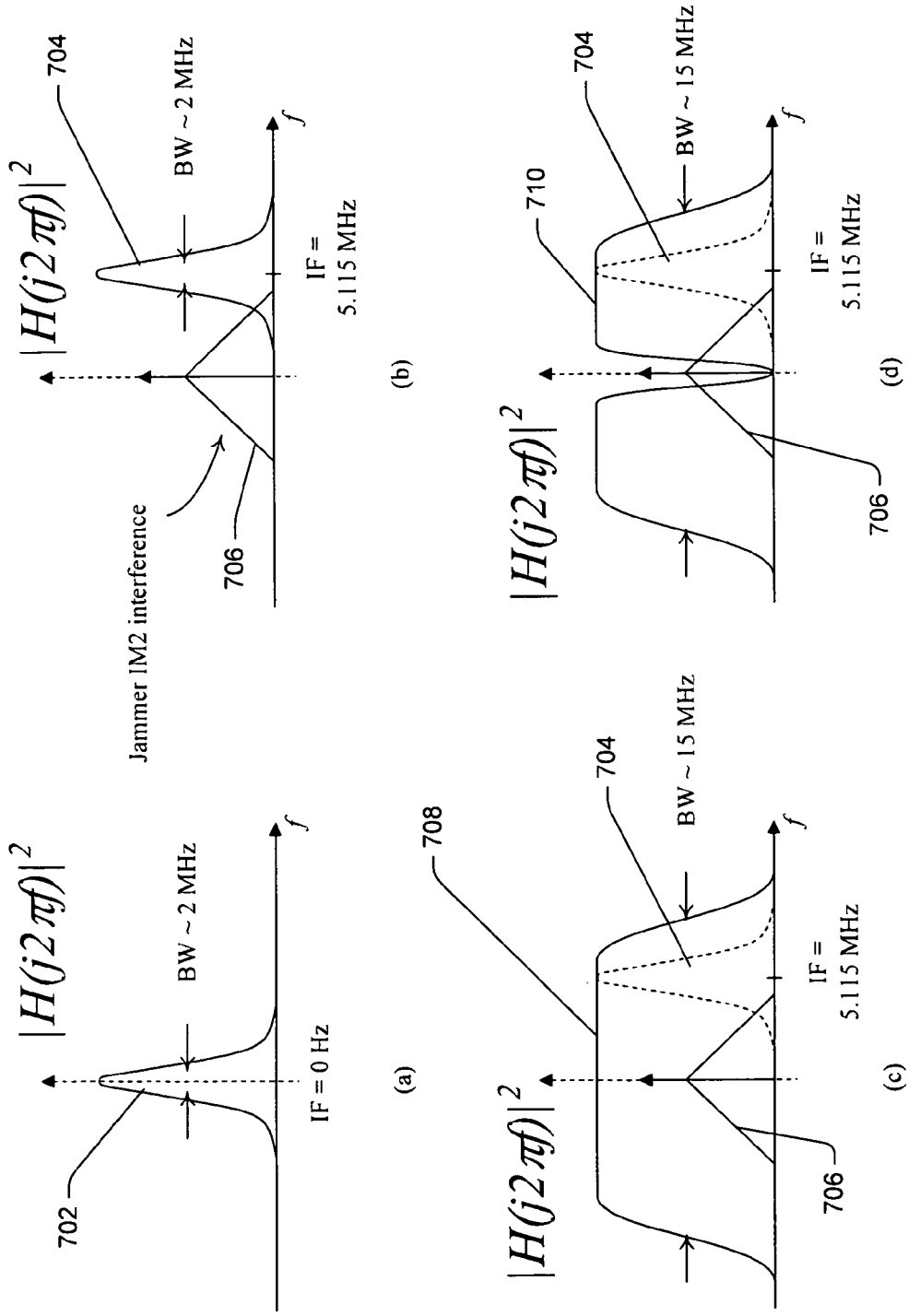
FIG. 7 includes four graphs that illustrate dynamic intermediate frequency scaling in accordance with an implementation and which may, for example, be implemented in the environment of FIG. 1 and/or device of FIG. 2.

Reference is made next to FIG. 7, which includes four graphs that illustrate dynamic intermediate frequency scaling in accordance with an implementation and which may, for example, be implemented in the environment of FIG. 1 and/or device of FIG. 2. More specifically, FIG. 7 illustrates various BBF frequency responses in connection with dynamic IF scaling.

Line 702 in FIG. 7(a) may be associated with an exemplary narrowband lowpass filter, with bandwidth approximately equal to the SPS signal bandwidth. For example, a GPS C/A code receiver may utilize a filter with a bandwidth of ~2 MHz. This BBF may provide an appropriate choice in ZIF mode. Since it provides no frequency separation from a jamming signal's IM2 product, this configuration may be appropriate when a cellular transmitter or the like is inactive, and/or when radiated power may be sufficiently low enough that possible IM2 interference power may not raise the thermal noise floor of the SPS receiver. Certain benefits of this example configuration may include a simple filter design and/or a relatively low DC power consumption.

As illustrated by line 704 in FIG. 7(b), the IF frequency has been increased, here for example to provide frequency separation from jamming signal IM2 represented by line 706. Such an IM2 product may have a center frequency of 0 Hz, and its two-sided bandwidth may be twice the jamming signal bandwidth. Such an IM2 product may also have a substantial DC component, as shown. If the SPS signal has bandwidth $B_{SPS}$ and the co-located transmitter bandwidth is $B_{TX}$, then to avoid the IM2 interference one may select an $f_{IF} > B_{TX} + B_{SPS}/2$. In the example illustrated in FIG. 7(b), the IF frequency has been chosen as 5*1.023=5.115 MHz, which may be high enough for a GPS C/A code receiver ($B_{SPS} \approx 2.05$ MHz) to avoid the IM2 product generated by WCDMA reverse link ($B_{TX} \approx 3.84$ MHz). Note that this choice of IF frequency may not, however, be high enough to avoid an IM2 interference generated by possible adjacent channel emissions, e.g., associated with a WCDMA transmitter output, but that interference may have a much lower power level.

In certain example implementations, the choice of IF frequency may be dynamically selected based, at least in part, on the basis of a transmitter bandwidth. For example, an IF frequency may not need to be as high during a CDMA 1× voice call ($B_{TX} \approx 1.23$ MHz) as during a WCDMA voice call. A lower IF frequency may enable reduced power consumption.

The BBF in FIG. 7(b) illustrates an exemplary translation of the narrowband response, such that the SPS signal may remain aligned with the filter center. Note, that such a resulting filter response may not be symmetrical in positive and negative frequencies; as this may be a complex filter.

Figure 6:
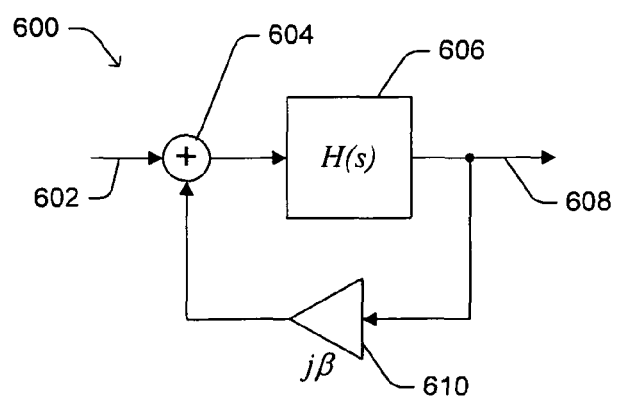
FIG. 6 is a schematic diagram illustrating certain portions of an exemplary receiver circuit that may, for example, be implemented in the environment of FIG. 1 and/or device of FIG. 2.

FIG. 6 shows an example of how such a filter 600 may be implemented, at least in part. Here, filter 600 may have an input 602 and an output 608, with components 604, 606 and 610 arranged there between. In this example, $H(s)=(A_v a)/(s+a)$ may be the transfer function of a 1st-order active filter with voltage gain $A_v$ and real pole at $s=-a$. With the complex multiplier $j\beta$ in the feedback path, e.g., via amplifier 610, the overall response may be one of a 1st-order filter 606 with pole shifted off the real axis to the point $s=-a+jA_v a\beta$. To align the filter response with the SPS signal, the gain $\beta$ may be chosen to satisfy $A_v a\beta=2\pi f_{IF}$. The complex multiplier may be implemented, for example, by swapping I and Q components: Given a signal pair (I, Q) at the amplifier 610 input, the signal pair at the output may be ($-\beta Q$, $\beta I$).

One drawback of the filter in FIG. 7(b) may be the additional circuit complexity required to implement a complex filter. Moreover, the center frequency of the filter may require on-chip tuning to ensure alignment with the signal. With this in mind, FIG. 7(c) shows an alternative filter response (line 708) that may be used with the same IF frequency. Here the complex filter may be replaced by a lowpass filter with wide bandwidth. This filter may not reject the IM2 distortion product at all, so ADC 412 may be enabled to provide sufficient dynamic range to pass such distortion without saturation. The IM2 product may then be subsequently removed, for example, by a digital filter and/or the like, after ADC 412 (e.g., within signal processing circuit 226 (see FIG. 2)).

FIG. 7(d) illustrates a modified filter (line 710) with the addition of a notch at DC, as may, for example, be accomplished by AC coupling the down-converter output. Such a notch may reject a large portion of the IM2 product, which may relax ADC 412 dynamic range requirements in certain implementations. If the selected IF frequency 704 has a high enough center frequency, the notch may be fairly wide, which may also affect ADC dynamic range requirements.

Reference is made once again to FIG. 4. IF control 400 may, for example, be implemented, at least in part, using a software state machine and/or the like. An interrupt may be generated based, at least in part, on environment parameter 212. For example, an interrupt may be generated by a DSP controlling transmitter circuit 232 when the transmitter produces or is about to produce output power that exceeds a corresponding threshold parameter 214. Upon receiving such interrupt, processor unit 206 may initiate changes in IF signal frequency and/or receiver bias (e.g., switch the receiver circuit into high linearity mode). In certain implementations, such operational changes may be related to other aspects of transmitter circuit 232 and/or receiver circuit 202, for example, such operational changes may occur based on band and/or channel of the transmitting signals.

In the absence of a strong jamming signal, receiver circuit 202 may be enabled as a ZIF receiver, which may reduce power consumption. In the presence of a strong jamming signal, the state machine may, for example, be enabled to initiate a transition to a LIF mode. Here, in certain implementations, the IF frequency in a LIF mode may be a function of transmitter band and/or channel, and/or transmitter bandwidth. For example, the IF frequency may be higher during 15 MHz LTE traffic in an AWS band than during 5 MHz LTE traffic in the AWS band.

Time and/or power hysteresis may be considered in certain implementations, for example, to possibly prevent the state machine from excessive toggling between states due to output power fluctuations. Since they may not carry great urgency, transitions to a state having a lower IF frequency might not be initiated by interrupt, but instead by low rate polling of output power, and/or other like measures.

Another exemplary interrupt generation mechanism may use digital logic and/or the like that may be enabled to consider in some manner a received signal strength (e.g., RSSI) from a cellular receiver (not shown). In certain other implementations it may be more beneficial, however, to consider transmitter output power, due to potentially different fading characteristics in uplink and downlink channels.

In certain other implementations, a more elaborate interrupt generation mechanism may be provided, for example, using analog and/or digital hardware and/or the like to provide detector circuit 234 in the form of a general-purpose jamming signal detector. Such a general-purpose jamming signal detector may be advantageous in certain implementations because it may enable an SPS receiver state to be adjusted not only on the basis of internally generated jamming signals, but also in response to external jamming signals. Furthermore such a jamming signal detector may not need to be coupled to a cellular transceiver and/or other like transmitter circuits.

In certain implementations receiver circuit 202 may need to be designed to consider possible discontinuities that may be introduced by changes of linearity state (e.g., via bias control 430) and/or when the IF frequency is adjusted (e.g., via IF control 400). Since PLL 416 may be reprogrammed and/or otherwise affected when the IF frequency changes, the PLL may unlock which may lead to an SPS signal outage while the PLL settles to its new frequency. Such a signal interruption should be limited to a few hundred microseconds, which should generally not adversely affect SPS receiver performance. For example, a GPS C/A code receiver may coherently integrate the signal for 20 ms; a signal outage of 0.2 ms in every coherent sum may degrade acquisition sensitivity by only ~0.04 dB. Hysteresis may be implemented within the state machine to reduce the frequency of interruptions and/or prevent such interruptions from happening. While PLL 416 may be unlocked, the LO frequency may swing far outside the SPS band. It could potentially swing through a strong jamming signal, which in that instant may fall into the SPS receiver passband. Thus there may be a potential for strong interference to be injected into the SPS signal integration, degrading the signal-to-noise ratio (e.g. C/No). This possibility may be avoided, for example, by blanking the SPS receiver while the PLL is unlocked. When blanked, the I/Q samples passed to the signal processing circuit 226 (which may, e.g., include one or more correlator(s)) may be forced to zero or to some other small value. The state of the SPS receiver may be operatively frozen while it is blanked. For example, to prevent external interference from perturbing digital automatic gain control (AGC), the state of an amplitude estimator and/or the like (not shown) that drives AGC may be operatively frozen.

Those skilled in the art will recognize that other blanking methods may be implemented. For example, an SPS receiver LNA may be de-energized while the PLL is unlocked, thus attenuating any jamming signals that might be mixed into the signal band by the swinging VCO.

When switching between different filter configurations as depicted in the example graphs in FIG. 7, and particularly when switching between narrowband and wideband filters, the group delay through the SPS receiver may change. Any such changes in group delay should be compensated somewhere in the SPS receiver, to prevent degradation in fix accuracy. For example, a group delay jump of 1 ns corresponds to a jump of ~30 cm in a pseudorange measurement. Jumps in group delay may be compensated, for example, by software in certain implementations. In other implementations, dedicated digital hardware may be used instead. For example, a tapped delay line (not shown) consisting of N registers updated at rate 1/T and/or the like may be used to implement a programmable delay of 0 to NT in coarse time steps. Fine group delay compensation may be implemented with a linear interpolation filter (not shown), which may be enabled to shift the location of the interpolation nodes. Such a shift of interpolation points is equivalent to a group delay shift.

In an exemplary LIF architecture, the image rejection ratio (IRR) of receiver circuit 202 may be determined, at least in large part, by the amplitude and phase imbalance of the LO. Unlike in the classical superheterodyne architecture, the RF filter may not be required to provide any suppression in the image band. An IRR of better than 20 dB may be achievable, and such an IRR may be sufficient provided that no strong jamming signals lie in the image band. Such a condition may be promoted by placing an upper bound on the IF frequency so that the image band lies in the same satellite radio navigation band as the desired signal.

For example, the GPS L1 signal with carrier frequency 1575.42 MHz lies in the band 1559-1610 MHz allocated worldwide to satellite radio navigation. A C/A code receiver may have a passband of width 2 MHz centered at 1575.42 MHz, in which case the image band may also be 2 MHz wide. If this C/A code receiver is a low IF receiver using low side injection, the image band may be enabled to lie within 1559-1610 MHz, e.g., if a maximum allowed IF frequency is 7.71 MHz. For a low IF receiver using high side injection, a corresponding maximum allowable IF frequency may be 16.79 MHz. Here, for example, as the GPS signal is located left of band center, there may be more room to fit an image band on the high side.

In accordance with certain example implementations, methods and apparatuses may be implemented to frequency down-convert a received RF signal to a corresponding first IF signal to effect or otherwise enable a reduction in receiver power consumption, and/or frequency down-convert a received RF signal to a corresponding second IF signal to effect or otherwise enable improved receiver performance in the possible presence of jamming RF signals.

Thus, by way of example but not limitation, a trigger for lowering an IF frequency may include a directive to operate in a low power mode, in which there may be a performance degradation in the presence of jammers. Such a directive may be user initiated, for example when enabling an airplane mode (which disables the co-located transceiver), or at other times. Such a directive may be initiated by software instructions/modules that may be enabled to monitor a battery level or the like, such that if the battery level drops below a threshold level then the SPS receiver may enter a mode to conserve power.

Thus, in certain implementations, IF switching may be implemented based, at least in part, on transmitter power, band, and/or bandwidth. Such IF switching may be implemented to save power, for example, when the robustness of a LIF receiver may be overkill or otherwise excessive. Here, such power savings may be opportunistic, in the sense that one may save power as the environment dictates. Thus, a trigger for switching between LIF and ZIF may be inherently related to the transmitter.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
   receiving a radio frequency (RF) signal; and
   based, at least in part, on a wireless environment parameter, selectively frequency down-converting said received RF signal to a first intermediate frequency (IF) signal having a first center frequency, and selectively frequency down-converting said received RF signal to a second IF signal having a second center frequency and wherein said second center frequency is greater than said first center frequency;

wherein said wireless environment parameter includes a time measurement since a wireless signaling was last detected; and wherein selectively frequency down-converting said received RF signal further comprises:

frequency down-converting said received RF signal to said second IF signal when said wireless environment parameter is equal to or greater than a threshold parameter, wherein said threshold parameter includes a maximum wireless signaling time period;

frequency down-converting said received RF signal to said corresponding first IF signal when said wireless environment parameter is less than said threshold parameter;

switching from the first IF signal to the second IF signal upon detecting occurrence of the wireless signaling; and switching from the second IF signal to the first IF signal upon detecting non-occurrence of the wireless signaling.

2. The method as recited in claim 1, wherein said threshold parameter is programmably and/or dynamically established.

3. The method as recited in claim 1, wherein at least one of said first center frequency and/or said second center frequency is programmably and/or dynamically established.

4. The method as recited in claim 1, further comprising:
accessing a first local oscillator (LO) signal operatively enabled for use in frequency down-converting said received RF signal to said corresponding first IF signal; and accessing a second LO signal operatively enabled for use in frequency down-converting said received RF signal to said corresponding second IF signal.

5. The method as recited in claim 4, further comprising:
selectively establishing either said first LO signal or said second LO signal with a programmable signal generating circuit.

6. The method as recited in claim 1, further comprising:
selectively programming at least one of a baseband filter circuit, an analog to digital converter circuit, and/or phase-locked loop circuit based, at least in part on said wireless environment parameter; or providing said received RF signal to a frequency down-converting circuit comprising at least one of a low phase noise down converter and/or a low power down converter.

7. The method as recited in claim 1, further comprising selectively programming a device operating mode that is associated with at least one of a device power consumption mode, a device communication mode, and/or a device navigation mode; or wherein said received RF signal comprises a satellite positioning system (SPS) signal.

8. The method as recited in claim 1, further comprising:
selectively frequency down-converting said received RF signal to either said corresponding first IF signal or at least said corresponding second IF signal based, at least in part, on a device power consumption mode.

9. The method as recited in claim 1, wherein selectively frequency down-converting said received RF signal further comprises:

frequency down-converting said received RF signal to said corresponding first IF signal to effect a reduction in receiver power consumption; and frequency down-converting said received RF signal to said corresponding second IF signal to effect an improved receiver performance in the possible presence of jamming RF signals.

10. The apparatus as recited in claim 1, wherein said threshold parameter is associated with the maximum wireless signaling time period.

11. The method as recited in claim 1, wherein with said first center frequency a receiver circuit operates as a zero IF (ZIF) architecture and with said second center frequency said receiver circuit operates as a low IF (LIF) architecture.

12. The method as recited in claim 1, further comprising detecting an interfering RF signal that is a voice communication signal that jams said received RF signal that is a satellite positioning system (SPS) signal;

wherein the interfering RF signal and the received RF signal are both processed by a single device; and further comprising detecting an absence of the interfering RF signal and selectively frequency down-converting to the first IF signal in response to detecting the absence of the interfering RF signal.

13. The method as recited in claim 1, further comprising detecting an interfering RF signal; and further comprising selectively frequency down-converting to the second IF signal in response to the detecting the interfering RF signal.

14. The method as recited in claim 13, wherein the interfering RF signal is detected at the first center frequency.

15. The method as recited in claim 1, further comprising:
down-converting the RF signal to the first IF signal having a first center frequency prior to detecting a presence of an interfering RF signal at the first center frequency;

detecting the presence of the interfering RF signal at the first center frequency after receiving the RF signal at the first center frequency; and selectively down-converting said received RF signal to the second IF signal having a second center frequency based on the detected interfering RF signal at the first center frequency.

16. The method as recited in claim 1, further comprising:
filtering a down-converted RF signal using a lowpass filter with a wide bandwidth such that the lowpass filter creates a notch at the first center frequency such that the notch rejects a portion of an interfering RF signal at the first center frequency.

17. The method as recited in claim 16, wherein the notch is created by AC coupling a down-converter output; and wherein the notch is wide enough to reject a large portion of the interfering RF signal.

18. The method as recited in claim 17, wherein a center frequency of the notch is at the first center frequency.

19. The method as recited in claim 1, wherein the wireless environment parameter is calculated by the performance of the transmitter circuit.

20. The method as recited in claim 19, further comprising providing different threshold parameters for different signal power levels.

21. An apparatus comprising:
a receiver circuit operatively enabled to receive a radio frequency (RF) signal and, based, at least in part, on a wireless environment parameter, selectively frequency down-convert said received RF signal to a first intermediate frequency (IF) signal having a first center frequency, and selectively frequency down-converting said received RF signal to a second IF signal having a second center frequency and wherein said second center frequency is greater than said first center frequency;

wherein said wireless environment parameter includes a time measurement since a wireless signaling was last detected; and wherein said receiver circuit is operatively enabled to frequency down-convert said received RF signal to said second IF signal when said wireless environment parameter is equal to or greater than a threshold parameter, wherein said threshold parameter includes a maximum wireless signaling time period;

wherein said receiver circuit is operatively enabled to frequency down-convert said received RF signal to said corresponding first IF signal if said wireless environment parameter is less than said threshold parameter;

wherein said receiver circuit is operatively enabled to switch from the first IF signal to the second IF signal upon detecting occurrence of the wireless signaling; and wherein said receiver circuit is operatively enabled to switch from the second IF signal to the first IF signal upon detecting non-occurrence of the wireless signaling.

22. The apparatus as recited in claim 21, wherein said threshold parameter is programmably and/or dynamically established.

23. The apparatus as recited in claim 21, wherein at least one of said first center frequency and/or said second center frequency is programmably and/or dynamically established.

24. The apparatus as recited in claim 21, further comprising:
at least one signal generating circuit operatively enabled to generate at least one of a first local oscillator (LO) signal operatively enabled for use in frequency down-converting said received RF signal to said corresponding first IF signal, and/or a second LO signal operatively enabled for use in frequency down-converting said received RF signal to said corresponding second IF signal.

25. The apparatus as recited in claim 24, wherein said at least one signal generating circuit comprises a programmable signal generating circuit operatively enabled to selectively generate either said first LO signal or said second LO signal.

26. The apparatus as recited in claim 21, wherein said receiver comprises at least one of a baseband filter circuit, an analog to digital converter circuit, and/or a phase-locked loop circuit that is selectively programmable based, at least in part on said wireless environment parameter.

27. The apparatus as recited in claim 21, wherein said receiver comprises a frequency down-converting circuit operatively enabled to receive said received RF signal and comprising at least one of a low phase noise downconverter and/or a low power down converter.

28. The apparatus as recited in claim 21, the receiver comprises a frequency down-converting circuit operatively enabled to provide a device operating mode that is associated with at least one of a device power consumption mode, a device communication mode, and/or a device navigation mode.

29. The apparatus as recited in claim 21, wherein said received RF signal comprises a satellite positioning system (SPS) signal.

30. The apparatus as recited in claim 21, wherein said receiver circuit is operatively enabled selectively frequency down-convert said received RF signal to either said corresponding first IF signal or at least said corresponding second IF signal based, at least in part, on a device power consumption mode.

31. The apparatus as recited in claim 21, wherein said receiver circuit is operatively enabled to:
frequency down-convert said received RF signal to said corresponding first IF signal to effect a reduction in receiver power consumption; and
frequency down-convert said received RF signal to said corresponding second IF signal to effect an improved receiver performance in the possible presence of jamming RF signals.

32. The apparatus as recited in claim 21, wherein with said first center frequency said receiver circuit operates as a zero IF (ZIF) architecture and with said second center frequency said receiver circuit operates as a low IF (LIF) architecture.

33. The apparatus as recited in claim 21, wherein the receiver circuit is operatively enabled to detect an interfering RF signal; and
wherein the receiver circuit is operatively enabled to selectively frequency down- converting to the second IF signal upon detecting the interfering RF signal.

34. The apparatus as recited in claim 33, wherein the interfering RF signal is detected at the first center frequency.

35. An apparatus comprising:
means for receiving a radio frequency (RF) signal; and
means for selectively frequency down-converting said received RF signal a first intermediate frequency (IF) signal having a first center frequency;
means for selectively frequency down-converting said received RF signal to a second IF signal having a second center frequency, based, at least in part, on a wireless environment parameter, and wherein said second center frequency is greater than said first center frequency,
wherein said wireless environment parameter includes a time measurement since a wireless signaling was last detected; and
wherein said means for selectively frequency down-converting said received RF signal is operatively enabled to:
frequency down-convert said received RF signal to said second IF signal when said wireless environment parameter is equal to or greater than a threshold parameter, wherein said threshold parameter includes a maximum wireless signaling time period;
frequency down-convert said received RF signal to said corresponding first IF signal if said wireless environment parameter is less than said threshold parameter;
switch from the first IF signal to the second IF signal upon detecting occurrence of the wireless signaling; and
switch from the second IF signal to the first IF signal upon detecting non-occurrence of the wireless signaling.

36. The apparatus as recited in claim 35, further comprising:
means for programmably and/or dynamically establishing said threshold parameter.

37. The apparatus as recited in claim 35, further comprising:
means for programmably and/or dynamically establishing at least one of said first center frequency and/or said second center frequency.

38. The apparatus as recited in claim 35, further comprising:
means for establishing a first local oscillator (LO) signal for use by said means for selectively frequency down-converting said received RF signal to frequency down-convert said received RF signal to said corresponding first IF signal; and
means for establishing a second LO signal for use by said means for selectively frequency down-converting said received RF signal to frequency down-convert said received RF signal to said corresponding second IF signal.

39. The apparatus as recited in claim 38, further comprising:

means for selectively establishing either said first LO signal or said second LO signal with a programmable signal generating circuit.

40. The apparatus as recited in claim 35, further comprising:
means for selectively programming at least one of a baseband filter circuit, an analog to digital converter circuit, and/or phase-locked loop circuit based, at least in part on said wireless environment parameter.

41. The apparatus as recited in claim 35, further comprising:
means for providing said received RF signal to a frequency down-converting circuit comprising at least one of a low phase noise downconverter and/or a low power down converter.

42. The apparatus as recited in claim 35, further comprising mean for operating in a device operating mode that is associated with at least one of a device power consumption mode, a device communication mode, and/or a device navigation mode.

43. The apparatus as recited in claim 35, wherein said received RF signal comprises a satellite positioning system (SPS) signal.

44. The apparatus as recited in claim 35, further comprising:
means for selectively frequency down-converting said received RF signal to either said corresponding first IF signal or at least said corresponding second IF signal based, at least in part, on a device power consumption mode.

45. The apparatus as recited in claim 35, wherein said means for selectively frequency down-converting said received RF signal frequency down-converts said received RF signal to said corresponding first IF signal to effect a reduction in receiver power consumption, and frequency down-converts said received RF signal to said corresponding second IF signal to effect an improved apparatus performance in the possible presence of jamming RF signals.

46. The apparatus of claim 35, wherein with said first center frequency said means for selectively frequency down-converting said received RF signal operates as a zero IF (ZIF) receiver architecture and with said second center frequency said means for selectively frequency down-converting said received RF signal operates as a low IF (LIF) receiver architecture.

47. The apparatus as recited in claim 35, further comprising a means for detecting an interfering RF signal; and
wherein the means for selectively down-converting to the second IF signal configured to selectively down-converting to the second IF signal upon detecting the interfering RF signal.

48. The apparatus as recited in claim 47, wherein the interfering RF signal is detected at the first center frequency.

49. A non-transitory computer readable medium having stored thereon computer implementable instructions which if implemented by one or more processing units operatively enables the one or more processing units to:
access a wireless environment parameter; and
based, at least in part, on said wireless environment parameter, selectively enable a receiver circuit operatively enabled to receive a radio frequency (RF) signal to frequency down- convert said received RF signal to a first intermediate frequency (IF) signal having a first center frequency, and selectively frequency down-converting to a second IF signal having a second center frequency, wherein said second center frequency is greater than said first center frequency,
wherein said wireless environment parameter includes a time measurement since a wireless signaling was last detected; and
wherein selectively enable the receiver circuit operatively to frequency down-convert said RF signal further comprises:
frequency down-convert said received RF signal to said second IF signal when said wireless environment parameter is equal to or greater than a threshold parameter, wherein said threshold parameter includes a maximum wireless signaling time period;
frequency down-convert said received RF signal to said corresponding first IF signal when said wireless environment parameter is less than said threshold parameter;
switch from the first IF signal to the second IF signal upon detecting occurrence of the wireless signaling; and
switch from the second IF signal to the first IF signal upon detecting non-occurrence of the wireless signaling.

50. The non-transitory computer readable medium as recited in claim 49, wherein said computer implementable instructions, if implemented by the one or more processing units, operatively enable the one or more processing units to:
access the threshold parameter.

51. The non-transitory computer readable medium as recited in claim 50, wherein said computer implementable instructions, if implemented by the one or more processing units, operatively enable the one or more processing units to:
programmably and/or dynamically establish said threshold parameter.

52. The non-transitory computer readable medium as recited in claim 50, wherein said threshold parameter is associated with the maximum wireless signaling time period.

53. The non-transitory computer readable medium as recited in claim 49, wherein said computer implementable instructions, if implemented by the one or more processing units, operatively enable the one or more processing units to:
programmably and/or dynamically establish at least one of said first center frequency and/or said second center frequency.

54. The non-transitory computer readable medium as recited in claim 49, wherein said computer implementable instructions, if implemented by the one or more processing units, operatively enable the one or more processing units to:
enable access to a first local oscillator (LO) signal operatively enabled for use in frequency down-converting said received RF signal to said corresponding first IF signal; and
enable access to a second LO signal operatively enabled for use in frequency down-converting said received RF signal to said corresponding second IF signal.

55. The non-transitory computer readable medium as recited in claim 54, wherein said computer implementable instructions, if implemented by the one or more processing units, operatively enable the one or more processing units to:
selectively initiate establishment of either said first LO signal or said second LO signal with a programmable signal generating circuit.

56. The non-transitory computer readable medium as recited in claim 49, wherein said computer implementable instructions, if implemented by the one or more processing units, operatively enable the one or more processing units to:
selectively program at least one of a baseband filter circuit, an analog to digital converter circuit, and/or phase-locked loop circuit based, at least in part on said wireless environment parameter.

57. The non-transitory computer readable medium as recited in claim 49, wherein said received RF signal comprises a satellite positioning system (SPS) signal.

58. The non-transitory computer readable medium as recited in claim 49, wherein said computer implementable instructions, if implemented by the one or more processing units, operatively enable the one or more processing units to:
selectively initiate frequency down-conversion of said received RF signal to either said corresponding first IF signal or at least said corresponding second IF signal based, at least in part, on a device power consumption mode.

59. The non-transitory computer readable medium as recited in claim 49, wherein said computer implementable instructions, if implemented by the one or more processing units, operatively enable the one or more processing units to:
initiate frequency down-conversion of said received RF signal to said corresponding first IF signal to effect a reduction in receiver power consumption; and
initiate frequency down-conversion of said received RF signal to said corresponding second IF signal to effect an improved receiver performance in the possible presence of jamming RF signals.

60. The non-transitory computer readable medium as recited in claim 49, wherein with said first center frequency said receiver circuit operates as a zero IF (ZIF) architecture and with said second center frequency said receiver circuit operates as a low IF (LIF) architecture.

61. The non-transitory computer readable medium as recited in claim 49, further comprising detecting an interfering RF signal; and
further comprising selectively frequency down-converting to the second IF signal in response to the detecting of the interfering RF signal.

62. The non-transitory computer readable medium as recited in claim 61, wherein the interfering RF signal is detected at the first center frequency.

63. A method comprising:
receiving a radio frequency (RF) signal; and
based, at least in part, on a wireless environment parameter, selectively frequency down-converting said received RF signal to a first intermediate frequency (IF) signal having a first center frequency, and selectively frequency down-converting said received RF signal to a second IF signal having a second center frequency and wherein said second center frequency is greater than said first center frequency,
wherein said wireless environment parameter includes a time measurement since a wireless signaling was last detected;
wherein selectively frequency down-converting said received RF signal further comprises:
frequency down-converting said received RF signal to said corresponding first IF signal if said wireless environment parameter is less than a threshold parameter;
frequency down-converting said received RF signal to said corresponding second IF signal if said wireless environment parameter is equal to or greater than said threshold parameter,
wherein said threshold parameter includes a maximum wireless signaling time period;
switching from the first IF signal to the second IF signal upon detecting occurrence of the wireless signaling; and
switching from the second IF signal to the first IF signal upon detecting non-occurrence of the wireless signaling.

64. A method comprising:
receiving a radio frequency (RF) signal; and
based, at least in part, on a wireless environment parameter, selectively frequency down- converting said received RF signal to a first intermediate frequency (IF) signal having a first center frequency, and selectively frequency down-converting said received RF signal to a second IF signal having a second center frequency and said second center frequency is greater than said first center frequency,
wherein said wireless environment parameter includes a time measurement since a wireless signal was last detected;
wherein selectively frequency down-converting said received RF signal further comprises:
frequency down-converting said received RF signal to said second IF signal when said wireless environment parameter is equal to or greater than a threshold parameter, wherein said threshold parameter includes a maximum wireless signaling time period;
frequency down-converting said received RF signal to said first IF signal when said wireless environment parameter is less than the threshold parameter;
switching from the first IF signal to the second IF signal upon detecting occurrence of the wireless signaling; and
switching from the second IF signal to the first IF signal upon detecting non-occurrence of the wireless signaling.

65. An apparatus comprising:
a receiver circuit operatively enabled to receive a radio frequency (RF) signal and, based, at least in part, on a wireless environment parameter, selectively frequency down-convert said received RF signal to a first intermediate frequency (IF) signal having a first center frequency, and selectively frequency down-converting said received RF signal to a second IF signal having a second center frequency and wherein said second center frequency is greater than said first center frequency;
wherein said wireless environment parameter includes a time measurement since a wireless signaling was last detected;
wherein said receiver circuit is operatively enabled to frequency down-convert said received RF signal to said corresponding first IF signal if said wireless environment parameter is less than a threshold parameter, frequency down-convert said received RF signal to said corresponding second IF signal if said wireless environment parameter is equal to or greater than said threshold parameter, switch from the first IF signal to the second IF signal upon detecting occurrence of the wireless signaling, and switch from the second IF signal to the first IF signal upon detecting non-occurrence of the wireless signaling, and
wherein said threshold parameter includes a maximum wireless signaling time period.

66. An apparatus comprising:
a receiver circuit operatively enabled to receive a radio frequency (RF) signal and, based, at least in part, on a wireless environment parameter, selectively frequency down-convert said received RF signal to a first intermediate frequency (IF) signal having a first center frequency, and selectively frequency down-converting said received RF signal to a second IF signal having a second center frequency and wherein said second center frequency is greater than said first center frequency;

wherein said wireless environment parameter includes a time measurement since a wireless signaling was last detected; and wherein selectively frequency down-convert said received RF signal further comprises:

frequency down-convert said received RF signal to said corresponding second IF signal when said wireless environment parameter is equal to or greater than a threshold parameter, wherein said threshold parameter includes a maximum wireless signaling time period; and frequency down-convert said received RF signal to said corresponding first IF signal when said wireless environment parameter is less than said threshold parameter, wherein the receiver circuit is further operatively enabled to switch from the first IF signal to the second IF signal upon detecting occurrence of the wireless signaling, and wherein the receiver circuit is further operatively enabled to switch from the second IF signal to the first IF signal upon detecting non-occurrence of the wireless signaling.

* * * * *